US005805190A

United States Patent [19]

Tsuchii et al.

[11] Patent Number: 5,805,190

[45] Date of Patent: Sep. 8, 1998

[54] METHOD AND APPARATUS FOR JET PRINTING WITH INK AND A PRINT PROPERTY IMPROVING LIQUID

[75] Inventors: Ken Tsuchii, Sagamihara; Makoto Shioya, Tokyo, both of Japan

[73] Assignee: Canon Kabushiki Kaisha, Tokyo, Japan

[21] Appl. No.: 600,166

[22] Filed: Feb. 12, 1996

[30] Foreign Application Priority Data

| | | | |
|---|---|---|---|
| Feb. 13, 1995 | [JP] | Japan | 7-023866 |
| Feb. 8, 1996 | [JP] | Japan | 8-022707 |

[51] Int. Cl.[6] .............. G01D 11/00; B41J 2/01; B41J 2/17

[52] U.S. Cl. .............. 347/100; 347/95; 347/101

[58] Field of Search .............. 347/95, 100, 101

[56] References Cited

U.S. PATENT DOCUMENTS

| | | | |
|---|---|---|---|
| 4,177,075 | 12/1979 | Mansukhani | 347/100 |
| 4,196,437 | 4/1980 | Hertz | 347/100 |
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,599,627 | 7/1986 | Vollert | 347/20 |
| 4,608,577 | 8/1986 | Hori | 347/66 |
| 4,630,076 | 12/1986 | Yoshimura | 347/43 |
| 4,723,129 | 2/1988 | Endo et al. | 347/56 |
| 4,740,796 | 4/1988 | Endo et al. | 347/56 |
| 4,746,928 | 5/1988 | Yamada et al. | 347/100 |
| 4,952,943 | 8/1990 | Iwata et al. | 347/100 |
| 5,026,427 | 6/1991 | Mitchell et al. | 347/100 |

FOREIGN PATENT DOCUMENTS

| | | |
|---|---|---|
| 0 587 164 | 3/1994 | European Pat. Off. . |
| 0 671 268 | 9/1995 | European Pat. Off. . |
| 54-056847 | 5/1979 | Japan . |
| 55-065269 | 5/1980 | Japan . |
| 55-066976 | 5/1980 | Japan . |
| 56-89595 | 7/1981 | Japan . |
| 59-123670 | 7/1984 | Japan . |
| 59-138461 | 8/1984 | Japan . |
| 60-071260 | 4/1985 | Japan . |
| 61-249755 | 11/1986 | Japan . |
| 63-299971 | 12/1988 | Japan . |
| WO 95/03940 | 2/1995 | WIPO . |

OTHER PUBLICATIONS

Asai, et al., "Impact of an Ink Drop on Paper," *Journal of Imaging Science and Technology*, vol. 37, No. 2, pp. 205–207, Mar./Apr. 1993.

Asai, et al., "Impact of an Ink Drop on Paper," *The Society for Imaging Science and Technology's Seventh International Congress Final Program and Proceedings*, pp. 146–151, Oct. 1991.

*Primary Examiner*—Peter S. Wong
*Assistant Examiner*—Bao Q. Vu
*Attorney, Agent, or Firm*—Fitzpatrick, Cella, Harper & Scinto

[57] ABSTRACT

An ink jet printing method forms an image by ejecting a printing property improving liquid which improves printing property of ejected ink onto a printing medium in advance of ejection of the ink onto the printing medium, and ejecting the ink to the printing property improving liquid applied on the printing medium. The ink is ejected onto the printing property improving liquid layer under a condition where a specific relational expression of a thickness of a liquid layer of the printing property improving liquid covering a region of the printing medium to be covered with the ink after impacting the ink thereon, a diameter of the ejected ink and ink ejection speed and so forth is satisfied.

19 Claims, 9 Drawing Sheets

METHOD AND APPARATUS FOR JET PRINTING WITH INK AND A PRINT PROPERTY IMPROVING LIQUID

BACKGROUND OF THE INVENTION

1. Field of the Invention

The present invention relates to a method and an apparatus for ink jet printing for performing printing by ejecting an ink to form flying ink droplet and depositing the ink-droplet onto a printing medium.

More specifically, the invention relates to an ink jet printing method for obtaining a printing image with improved water-resistance, light resistance for higher reliability or for obtaining a high quality printing image with less feathering and bleeding between colors and with higher printing density.

Also, the invention relates to a color ink jet printing method which can print clear color image at high density, and more particularly to an ink jet printing method employing color inks of yellow (Y), magenta (M) and cyan (C) or green (G), red (R) and blue (B) and so forth, and a black (Bk) ink.

The present invention is applicable to any devices which use a paper, a cloth, a leather, a non-woven fabric, OHP sheet and so forth, and further a metal and the like as printing medium. As concrete devices, a printer, a copy machine, facsimile and other office appliance and/or an industrial production facility and so forth.

2. Description of the Related Art

An ink jet printing apparatus widely spread for high printing quality, high printing speed, quietness during operation.

However, the ink jet printing system holds the following problems holding back high quality printing.

(1) Since the ink penetrates along fiber of the paper after impacting onto the surface of the paper, the dot shape is irregularly distorted (hereinafter referred to as "feathering").

(2) Bluring can be caused at the boundary between different color inks (hereinafter referred to as "bleeding").

(3) The ink has poor water resistance to cause washing out of the printed image when a water is applied to the printed image.

As a solution for these problems, and as means for realizing high quality image printing, a dedicated paper having a good quality of ink absorbing layer on a printing medium has been developed and used.

By this method, all of the foregoing three problems are solved and thus high quality image printing with high water-resistance can be realized.

However, the dedicated paper is a special paper to cause high cost. Also, the user may not print on another available paper and has to hold the dedicated paper to cause inconvenience. In such reason, demand for realization of high printing quality with a plain paper equivalent to that obtained by the dedicated paper has becomes more and more strong, in the recent years.

On the other hand, in a plain paper-printing not employing the dedicated paper, for improving image fixing ability and reduction smear and/or bleeding, a method for adding a compound, such as a surfactant or the like to enhance penetration ability has been proposed in Japanese Patent Application Laying-open No. 65269/1980. Also, a method for employing an ink containing a volatile solvent as primary component has been proposed in Japanese Patent Application Laying-open No. 66976/1980.

In the former method employing the surfactant or the like, since the penetration speed of the ink into the printing medium is high, even when different colors of inks are ejected to adjacent pixels sequentially, the ink ejected at the earlier timing has already penetrated in the printing medium completely upon impacting of the ink droplet of the ink of the later order. Therefore, the different kinds of inks will never be mixed on the surface of the paper to avoid occurrence of bleeding. Also, since fixing of the ink becomes faster, problems of smear and so forth can be significantly improved.

However, since penetration of the ink into the paper fiber is caused by capillary action, the ink penetration path directly reflects the fibrous structure of the printing medium to cause degradation of feathering. Also, since the ink penetrates between fibers of the paper, the ink may penetrate into the deeper portion of the paper as viewed from the surface to cause lowering of printing density.

On the other hand, by the later method employing the ink containing the volatile solvent as a major component, in addition to the problems pointed out above, plugging can be caused at the evaporation of the solvent at a nozzle portion or ink ejection openings of a printing head.

On the other hand, concerning a problem of water-resistance of the ink for the plain paper, it is the conventional way to provide water-resistance for the ink. This kind of ink becomes difficult to resolve the ink into the water after once dried. Therefore, plugging of the printing head can be easily caused.

It is possible to prevent plugging of the ink. However, such measure makes the construction of the apparatus complicated.

In view of the drawbacks set forth above, a method to deposit a printing property improving liquid which makes the ink insoluble, on the printing medium in advance of ejection of the ink, has been proposed.

In concrete, such methods have been disclosed in Japanese Patent Application Laying-open Nos. 299971/1988 and 249755/1986, for example. In these methods, once the ink reacts with the preliminarily ejected printing property improving liquid, the dyestuff of the ink becomes chemically insoluble. Therefore, the printed image may have quite ideal water-resistance.

However, in the former publication, there is a disclosure that when the ink is ejected in the condition where the preliminarily ejected printing property improving liquid remains on the surface of the printing medium, the ink ejected to the preliminarily ejected printing property improving liquid is jumped up (hereinafter referred to as "splatter") to splash over the printing medium to degrade printing image. Furthermore, there is a disclosure that, in order to avoid this, it is desirable to eject the ink immediately after completion of penetration of the preliminarily ejected printing property improving liquid into the printing medium.

However, the ink impacting on the printing medium after completion of penetration of the preliminarily deposited printing property improving liquid into the printing medium, basically penetrates into the printing medium by capillary action into the fiber structure of the printing medium while it reacts with the printing property improving liquid deposited on the fiber on the surface of the printing medium and the printing property improving liquid partially maintained within the fiber structure, to a certain extent.

As a result, the penetration path of the ink may reflect the structure of the paper fiber to cause feathering, albeit slightly less than that caused by ejecting the ink onto the paper, to which the printing property improving liquid is not ejected. On the other hand, in conjunction therewith, the ink penetrates into the inside of the printing medium to cause lowering of density.

Furthermore, since penetration of the ink into the printing medium is caused, it becomes not possible to suppress bleeding caused by penetration of a different color of the ink ejected to the adjacent region into the region in the printing medium where penetration of the ink is completed. As a result, while only water resistance is achieved at quite high level, quality of the printing image is held in low level due to presence of bleeding.

On the other hand, in the later publication (Japanese Patent Application Laying-open No. 249755/1986), there is a disclosure of an example where the ink ejects a thin film later of an ink solidification agent deposited on the printing medium in the extent of the ink droplet to be solidified. When the ink droplet ejects on a liquid layer under the condition where a thick liquid layer is present on the printing medium, splatter is caused as set forth above to cause degradation of the printing image. However, there is no disclosure for means to avoid this, in the above-mentioned publication.

SUMMARY OF THE INVENTION

It is an object of the present invention to provide an ink jet printing method and an ink jet printing apparatus which can realize dot formation in high density and realize image printing in quite high quality without causing splattering, feathering and bleeding, with achieving high level water-resistance of the printing image.

Another object of the present invention is to provide a printing product obtained by implementing or using the above-mentioned ink jet printing method and printing apparatus.

In a first aspect of the present invention, there is provided an ink jet printing method for forming an image by ejecting a printing property improving liquid which improves printing property of ejected ink onto a printing medium in advance of ejection of the ink onto the printing medium, and ejecting the ink to the printing property improving liquid applied on the printing medium, wherein assuming a thickness of a liquid layer of the printing property improving liquid covering a region of the printing medium to be covered with the ink after impacting the ink thereon being ts at the moment of the ink impact on the printing medium, a diameter of the ejected ink being d and ink ejection speed being v, the ink being impacted on the region on the printing medium under the condition satisfying any one of the following conditions (1) to (5):

(1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts \leqq 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$ wherein $Re = d \cdot v / \nu$ $We = \rho \cdot d \cdot v^2 / \sigma$ $\nu$: kinetic viscosity of ink $\sigma$: surface tension of ink $\rho$: density of ink The ink may be impacted in the condition satisfying in $20000 \leqq Re \cdot We < 25000$, the thickness ts of the printing property improving liquid layer is in a range of $0 < ts < d/2$.

The ink may be impacted in the condition satisfying in $25000 \leqq Re \cdot We < 29000$, the thickness ts of the printing property improving liquid layer is in a range of $0 < ts < h/2$, wherein h is a maximum height of the ink to be abruptly dispersed in disk shaped configuration immediately after impacting on the printing medium.

Thickness may be an average thickness of the liquid layer of the printing property improving liquid in the region of the printing medium to be covered with the ink after impacting the ink thereon.

An electromechanical transducer may be employed as means for ejecting the ink and the printing property improving liquid.

An electro-thermal transducer may be employed as means for ejecting the ink and the printing property improving liquid.

A combination of an electromechanical transducer and an electro-thermal transducer may be employed as means for ejecting the ink and the printing property improving liquid.

The printing property improving liquid may contain low molecular cation material and high molecular cation material, and the ink contains an anionic dyestuff.

The printing property improving liquid may contain low molecular cationic substance and high molecular cationic substance, and the ink at least contains anionic compound and a pigment.

In a second aspect of the present invention, there is provided an ink jet printing apparatus for forming an image by ejecting a printing property improving liquid which improves printing property of ejected ink, from a printing property improving liquid ejecting portion onto a printing medium in advance of ejection of the ink onto the printing medium, and ejecting the ink from an ink ejecting portion to the printing property improving liquid applied on the printing medium, comprising:

ejection controller for ejecting the ink onto a region of the printing medium to be covered therewith under a condition satisfying any one of the following conditions (1) to (5) assuming a thickness of a liquid layer of the printing property improving liquid covering the region of the printing medium to be covered with the ink after impacting the ink thereon being ts at the moment of the ink impact on the printing medium, a diameter of the ejected ink being d and ink ejection speed being v, (1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts \leqq 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$ wherein $Re = d \cdot v / \nu$ $We = \rho \cdot d \cdot v^2 / \sigma$ $\nu$: kinetic viscosity of ink $\sigma$: surface tension of ink $\rho$: density of ink The ink ejecting portion may be reciprocally movable on the printing medium.

The ink ejecting portion and the printing property improving liquid ejecting portion may be arranged in the reciprocating direction.

The ink ejecting portion and the printing property improving liquid ejecting portion may have thermal energy generating body for providing thermal energy for ejection of the ink and the printing property improving liquid.

In a third aspect of the present invention, there is provided an image forming apparatus, comprising:

an ink jet printing apparatus for forming an image by ejecting a printing property improving liquid which improves printing property of ejected ink, from a printing property improving liquid ejecting portion onto a printing medium in advance of ejection of the ink onto the printing medium, and ejecting the ink from an ink ejecting portion to the printing property improving liquid applied on the printing medium;

ejection controller for ejecting the ink onto a region of the printing medium to be covered therewith under a condition satisfying any one of the following conditions (1) to (5) assuming a thickness of a liquid layer of the printing property improving liquid covering the region of the printing medium to be covered with the ink after impacting the ink thereon being ts at the moment of the ink impact on the printing medium, a diameter of the ejected ink being d and ink ejection speed being v, (1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts < 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$ wherein $Re = d \cdot v / \nu$ $We = \rho \cdot d \cdot v^2 / \sigma$ $\nu$: kinetic viscosity of ink $\sigma$: surface tension of ink $\rho$: density of ink receiver for receiving an image data from an external device; and image data supplier for supplying the image data obtained through the receiver to the ink jet printing apparatus.

In a fourth aspect of the present invention, there is provided an image forming apparatus, comprising:

an ink jet printing apparatus for forming an image by ejecting a printing property improving liquid which improves printing property of ejected ink, from a printing property improving liquid ejecting portion onto a printing medium in advance of ejection of the ink onto the printing medium, and ejecting the ink from an ink ejecting portion to the printing property improving liquid applied on the printing medium;

ejection controller for ejecting the ink onto a region of the printing medium to be covered therewith under a condition satisfying any one of the following conditions (1) to (5) assuming a thickness of a liquid layer of the printing property improving liquid covering the region of the printing medium to be covered with the ink after impacting the ink thereon being ts at the moment of the ink impact of on the printing medium, a diameter of the ejected ink being d and ink ejection speed being v, (1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts \leqq 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$ wherein $Re = d \cdot v / \nu$ $We = \rho \cdot d \cdot v^2 / \sigma$ $\nu$: kinetic viscosity of ink $\sigma$: surface tension of ink;

$\rho$: density of ink reader for reading an image;

image data supplier for supplying the image data obtained through the reader to the ink jet printing apparatus.

The printing apparatus may be constructed to be used as a terminal for a computer.

The printing apparatus may be constructed to be used in a copying machine.

The recording apparatus may be constructed to be used in a facsimile machine.

In a fifth aspect of the present invention, there is provided an printing product obtained by implementing an ink jet printing method for forming an image by ejecting a printing property improving liquid which improves printing property of ejected ink onto a printing medium in advance of ejection of the ink onto the printing medium, and ejecting the ink to the printing property improving liquid applied on the printing medium, wherein assuming a thickness of a liquid layer of the printing property improving liquid covering a region of the printing medium to be covered with the ink after impacting the ink thereon being ts at the moment of the ink impact on the printing medium, a diameter of the ejected ink being d and ink ejection speed being v, the ink being impacted on the region on the printing medium under the condition satisfying any one of the following conditions (1) to (5):

(1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts < 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$ wherein $Re = d \cdot v / \nu$ $We = \rho \cdot d \cdot v^2 / \sigma$ $\nu$: kinetic viscosity of ink $\sigma$: surface tension of ink $\rho$: density of ink Measurement of respective parameters were performed in the following methods.

1. Physical Property of Ink p: buoy method (JIS K0061 4.1)

$\eta$: E-type viscometer $\sigma$: Wilhelmy type surface tension $\nu$: calculated from $\eta/\rho$ 2. Physical Property of Ink Droplet v: Obtained through observation of impact of ink by means of microscope and strovo lighting device. Detail has been discussed in Asai, A., et al., "Impact of an Ink Drop on paper" IS & T 7th International Congress on Advances in Non-Impact Printing Technologies, 1991.

d: The same as the above.

3. Physical Property of Printing property improving liquid:

ts: By measuring consumption (in weight or capacity) of the printing property improving liquid upon ejection, an amount of the printing property improving liquid to be applied per a unit surface is derived. On the other hand, the penetration speed of the printing property improving liquid is preliminarily measured through Bristow test (J. TAPPI paper pulp Transiting Method Nos. 51–87). From the amount of printing property improving liquid and its penetration speed, a thickness ts of the printing property improving liquid at the impact of the ink on the media surface is calculated.

w: by performing observation of the impact of the ink with the similar device for measurement of the physical property of the ink to perform measurement of length; and h: derived from $h = w/2 + t1$, $t1 = 2\ \mu m$ It should be noted that, in the present invention, improvement of the printing property includes improvement of image quality, such as density, chroma, degree of sharpness at the edge portion of the image, dot diameter and so forth, improvement of ink fixing ability, and improvement of weather-resistance, i.e. durability of the image, such as water-resistance, light resistance and so forth. Also, the printing property improving liquid includes a liquid to make a dyestuff in the ink insoluble, a liquid to cause dispersion break down of a pigment in the ink, a printing property improving liquid and so forth. Here, making insoluble means a phenomenon to cause ionic interaction between an anion group contained in the dyestuff of the ink and a cation group of a cationic material included in the printing property improving liquid to cause ion coupling and whereby to cause separation of dyestuff which is uniformly dissolved in the ink, from the solution. It should be noted that even when not all of the dyestuff in the ink is made insoluble, the effects of suppression of color bleeding, improvement of color development, improvement of the image quality, improvement of fixing ability, which the present invention intends to achieve, can be attained when a part of the dyestuff in the ink is made insoluble. Also, the wording "coagulation" is used in the same meaning to "making insoluble" in case of a water soluble dyestuff, in which a coloring agent contains anion group. On the other hand, when the coloring agent employed in the ink is a pigment, ionic interaction between the pigment dispersing agent or the surface of pigment and cation group of cationic material included in the printing property improving liquid occurs to cause dispersion break down of the pigment to cause aggregation of pigment particle to form large diameter particle. Normally, associated with coagulation, viscosity of the ink is increased. It should be noted that even when not all of the pigment in the ink is made insoluble, the effects of suppression of color bleeding, improvement of color development, improvement of the image quality, improvement of fixing ability, which the present invention intends to achieve, can be attained when a part of the pigment in the ink is made insoluble.

The above and other objects, effects, feature and advantages of the present invention will become more apparent from the following description of embodiments thereof taken in conjunction with the accompanying drawings.

BRIEF DESCRIPTION OF THE DRAWINGS

FIGS. 1A and 1B are illustrations showing a condition immediately after complete collapse of an ink droplet which is in spherical form upon ejection, wherein FIG. 1A is a plan view as viewed in a direction perpendicular to the printing medium, and FIG. 1B is a cross sectional view thereof;

DESCRIPTION OF THE PREFERRED EMBODIMENT

The present invention will be discussed hereinafter in detail in terms of the preferred embodiments of the invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order not to unnecessarily obscure the present invention.

Figure 9:
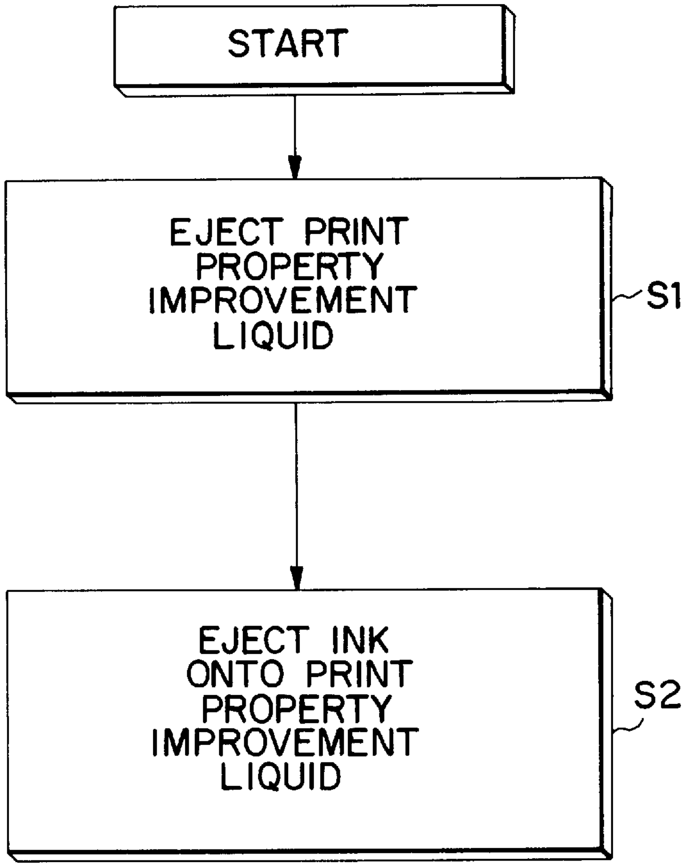
FIG. 9 is a flow chart of the printing process of the present invention.

In the present invention, as shown in the flow chart of FIG. 9, an ink is ejected to a printing medium in Step S2 in a condition in which the entire region on the printing medium to be covered with the ejected ink after impacting thereof, are covered in Step S1 with a liquid layer of a printing property improving liquid. The ink impacting the liquid layer contacts with the printing property improving liquid over the entire surface thereof before contacting with fiber of the paper as the printing medium. Instantly, the dyestuff is caused to coagulate or made insoluble from the surface of the ink droplet. Thus, viscosity of the ink is lowered to flowability. As a result, even after completion of penetration of the printing property improving liquid, the ink remains on the surface of the printing medium without penetrating into the printing medium and is deposited on the fiber of the paper in the vicinity of the surface of the printing medium with maintaining the shape at the time of impacting.

Accordingly, since the dot can be formed without being affected by the structure of the paper fiber of the printing medium, no feathering will be caused in principle and high density dots can be formed. Furthermore, since the dyestuff is coagulated or made insoluble from the surface of the ink droplet within a quite short period after hitting or impacting to lower flowability of the ink droplet, formed dots will not be mixed to each other. Therefore, the adjacent dots located in close proximity to each other can be held separate so as not to cause bleeding.

Accordingly, assuming that the thickness of the liquid layer of the covering the entire region of the printing medium to be covered with the ink is ts, if $0<ts$ is established upon impacting the ink droplet, feathering and bleeding can be avoiding and high density dot can be formed.

On the other hand, concerning occurrence of splattering, the inventors found the following facts.

[1] Restricting $Re \cdot We<20000$, splattering will not be caused at $0<ts$;

[2] Within a range of $20000 \leqq Re \cdot We<25000$, splattering is caused slightly to affect medium quality of printed image at $d/2 \leqq ts$.

In order to attain higher quality, it becomes necessary to satisfy a condition of $ts<d/2$. In this inequality, d is a diameter of the ink droplet and d/2 is a radius of the ink droplet.

The condition $ts \leqq d/2$ means that the liquid surface of the printing property improving liquid on the printing medium is present more at the side of the printing medium than at the center of the ink droplet. At this condition, the printing property improving liquid is exerted with a force to urge a toward the printing medium by the ink droplet. Therefore, the ink may not be disturbed by the printing property improving liquid sneaking to the back side of beyond the center as that caused at $d/2 \leqq ts$, and thus splattering can be reduced.

[3] Within a range of $25000 \leqq Re \cdot We < 29000$, splattering is significant and the printed image becomes unacceptably low. However, at $ts < d/2$, splattering can be used to achieve medium level of image quality.

Figures 1A, 1B:
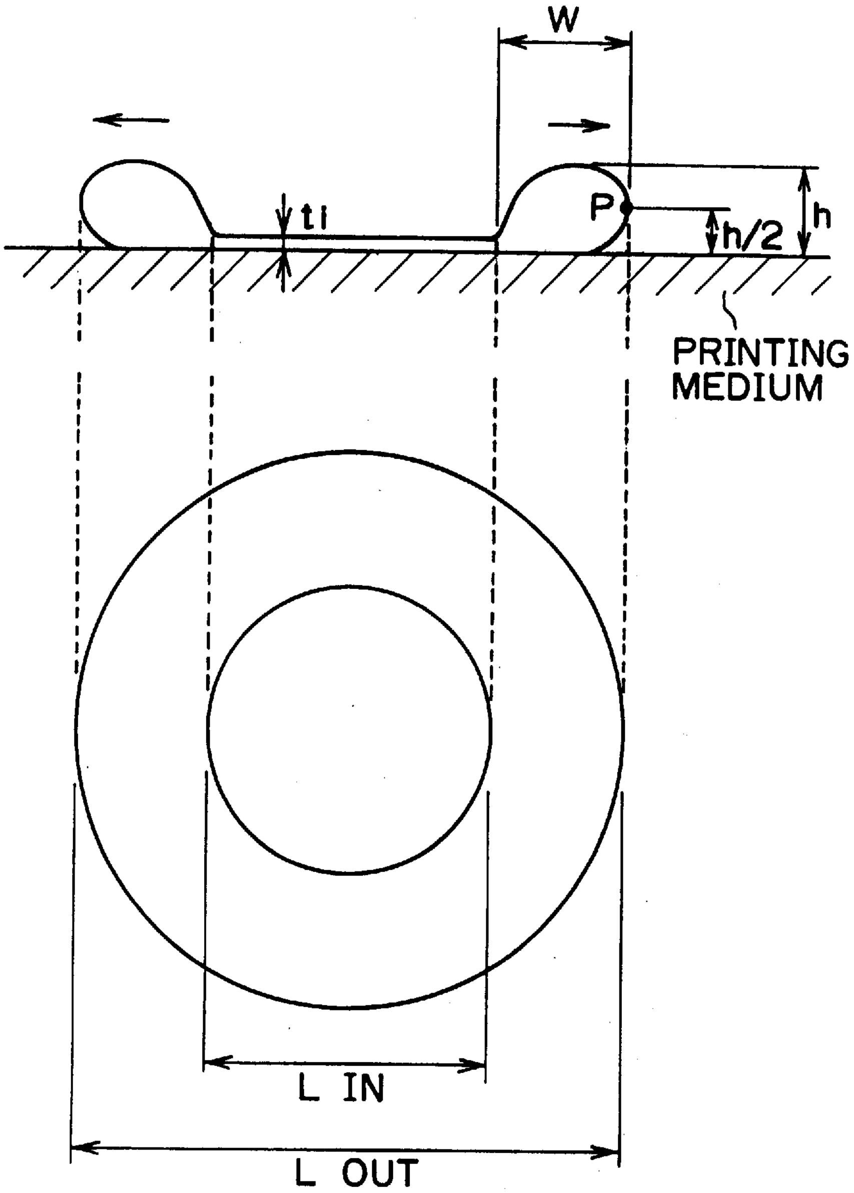

In order to realize higher image quality, it becomes necessary to satisfy the condition of $ts < h/2$. In the foregoing inequality, h is a maximum height of the ink to be abruptly dispersed in disk shaped configuration immediately after impacting on the printing medium. This is shown in FIGS. 1A and 1B. FIGS. 1A and 1B are illustrations showing a condition immediately after complete collapse of the spherical ink droplet by impacting. FIG. 1A is a plan view as seen from a direction perpendicular to the printing medium and FIG. 1B is a cross section of FIG. 1A. As diagrammatically shown in FIG. 1A, upon impacting, the ink is in a shape like a doughnut having an outer diameter Lout and inner diameter Lin as horizontally cut into half mounted on a thin disc of a thickness t1 and going to disperse at high speed in the direction of the arrows (radially outward of the ink) in FIG. 1B.

Meaning of the inequality $ts < h/2$ is that the liquid surface of the printing property improving liquid is positioned lower than the leading end P (distanced at about h/2 from the printing medium) of the ink being spreading in the direction of arrow in FIG. 1B. At this condition, the printing property improving liquid applied on the printing medium is urged basically toward to printing medium while the ink is spreading into disc shape after impacting to hardly cause splattering.

At this time, $h \simeq w/2 + ti$. Width w is a width of the portion bulged into doughnut shape, $w \simeq (L_{out} - L_{in})/2$. Width w can easily be measured by observation from the vertical direction. In the shown embodiment $w \simeq 20\ \mu m$. Also, since $ti \simeq 1$ to $2\ \mu m$, $$h \simeq 11 \text{ to } 12\ \mu m$$

$$h/2 \simeq 5.5 \text{ to } 6\ \mu m$$

[4] When $29000 \leqq Re \cdot We < 60000$ and $2\ \mu m < ts$, significant splattering is caused and the image quality is not acceptable. For realizing high image quality, it becomes necessary to satisfy a condition of $ts < 2\ \mu m$.

[5] When $60000 \leqq Re \cdot We$, splattering is caused even when the printing property improving liquid is not applied.

Accordingly, even when $0 < ts$, by appropriately selecting the foregoing condition depending upon the system of the printing medium, ink may be ejected to the layer of the printing property improving liquid applied on the printing medium without causing splattering.

EXAMPLES

In all of examples, the printing property improving liquid and the ink were employed.

| <Composition of Printing property improving liquid> | |
|---|---|
| PAA-HCl-3L (Nittobo K. K.) | 5.0 wt. % |
| Cation G50 (Sanyo Kasei K. K.) | 0.3 wt. % |

-continued

| | |
|---|---|
| Diethylene glycol | 10.0 wt. % |
| Lithium acetate | 0.5 wt. % |
| water | 84.2 wt. % |
| Total | 100.0 wt. % |
| <Composition of Ink> | |
| Glycerine | 7.5 wt. % |
| Thiodigrycol | 7.5 wt. % |
| Urea | 7.5 wt. % |
| Dyestuff, C. I. direct blue-199 | 3.5 wt. % |
| Acetylenol EH (Kawa-ken Fine Chemical K. K.) | 1.0 wt. % |
| Water | 73.0 wt. % |
| Total | 100.0 wt. % |

Physical property values of this ink are as follow:

Density $\rho = 1.05$ g/cm$^3$

Viscosity $\eta = 1.9$ cP$= 0.019$ g·cm$^{-1}$·s$^{-1}$

Kinetic viscosity$\nu = \eta/\rho 0.018$ cm$^2$/s

Surface tension $\sigma = 30.0$ dyn/cm

[Example 1]

The printing property improving liquid and the ink were ejected by means of a head 1 (see FIG. 4) having the following specification.

<Head 1>

Ejection type: bubble-jet type

Number of nozzles: 64

Resolution of nozzle: 360 dpi

At this time, the ejection characteristics of the ink and the printing property improving liquid were as follows:

Ink Droplet Ejection Speed: v=8.9 m/s

Ink Droplet Diameter: d=36.4 $\mu$m

Printing Property Improving Liquid ejection amount: Vds=50.3 pl at this time $Re = d \cdot v/\nu = 179$ $We = \rho \cdot d \cdot v^2/\sigma = 101$ therefore, $Re \cdot We = 18079$ Under the foregoing condition, 125% solid printing of the printing property improving liquid was performed on the plain paper. Thereafter, at a timing where the printing property improving liquid starts to penetrate into the plain paper and the thickness ts of the liquid layer of the printing property improving liquid becomes $ts \simeq 10\ \mu m$, ink is ejected to perform printing.

The thickness ts of the printing property improving liquid layer can be adjusted by measuring the penetration period of the printing property improving liquid into the paper by Bristow testing method and by appropriately adjusting a time interval between ejection of the printing property improving liquid and the ink on the basis of the measured penetration period. In the foregoing condition, the thickness of the printing property improving liquid layer at a timing immediately after ejection where penetration is substantially not started, is calculated as $ts \simeq 12.5\ \mu m$. Accordingly, after ejection of printing property improving liquid, the ink can be ejected at a timing approximately 20% of penetration period of the printing property improving liquid into the paper.

[Example 2]

The head employed and its driving condition are the same as the foregoing example 1.

Accordingly, similarly to the example 1, $Re \cdot We = 18079$.

Under the condition set forth above, after printing the printing property improving liquid on the plain paper in 225% solid printing, the ink is ejected for printing at a timing where penetration of the printing property improving liquid is started and the thickness ts of the liquid layer of the printing property improving liquid becomes ts≃20 μm.

[Example 3]

The head is substantially the same the head 1 in the principle of ejection, the nozzle resolution and number of nozzles are the same as the examples 1 and 2. However, the head employed in this example has the ejection openings having smaller cross section than that the head 1 to satisfy the following ink ejection characteristics.

The ink ejection characteristics at this time are as follows:

Ink Droplet Ejection Speed: v=10.0 m/s

Ink Droplet Diameter: d=35.0 μm

At this time, $Re=d\cdot v/\nu=193$ $We=\rho\cdot d\cdot v^2/\sigma=123$

Therefore, $Re\cdot We=23739$

After printing the printing property improving liquid on the plain paper in 125% solid printing, the ink is ejected for printing at a timing where penetration of the printing property improving liquid is started and the thickness ts of the liquid layer of the printing property improving liquid becomes ts≃10 μm.

[Example 4]

The head and its driving condition were the same as those of example 3. Accordingly, similarly to the example 3, $Re\cdot We=23739$ After printing the printing property improving liquid on the plain paper in 225% solid printing, the ink is ejected for printing at a timing where penetration of the printing property improving liquid is started and the thickness ts of the liquid layer of the printing property improving liquid becomes ts≃20 μm.

[Example 5]

While the head is the same as those of examples 3 and 4, the ink ejection characteristics are varied by making the charged pulse width longer.

Ink Droplet Ejection Speed v=10.2 m/s

Ink Droplet Diameter d=36.0 μm

At this time, $Re=d\cdot v/\nu=203$ $We=\rho\cdot d\cdot v^2/\sigma=131$

Therefore, $Re\cdot We=26593$

After printing the printing property improving liquid on the plain paper in 100% solid printing, the ink is ejected for printing at a timing where penetration of the printing property improving liquid is started and the thickness ts of the liquid layer of the printing property improving liquid becomes ts≃5 μm.

[Example 6]

The head and its driving condition were the same as that of example 5. Accordingly, similarly to the example 5, $Re\cdot We=26593$ After printing the printing property improving liquid on the plain paper in 125% solid printing, the ink is ejected for printing at a timing where penetration of the printing property improving liquid is started and the thickness ts of the liquid layer of the printing property improving liquid becomes ts≃10 μm.

[Example 7]

The head and its driving condition were the same as that of example 5. Accordingly, similarly to the example 5, $Re\cdot We=26593$ After printing the printing property improving liquid on the plain paper in 225% solid printing, the ink is ejected for printing at a timing where penetration of the printing property improving liquid is started and the thickness ts of the liquid layer of the printing property improving liquid becomes ts≃20 m.

[Example 8]

While the head is the same as those of examples 3 to 7, the ink ejection characteristics are varied by making the charged pulse width longer.

ink droplet ejection speed v=10.7 m/s ink droplet diameter d=36.6 μm

At this time, $Re=d\cdot v/\nu=216$ $We=\rho\cdot d\cdot v^2/\sigma=147$

Therefore, $Re\cdot We=31752$

After printing the printing property improving liquid on the plain paper in 100% solid printing, the ink is ejected for printing at a timing where penetration of the printing property improving liquid is started and the thickness ts of the liquid layer of the printing property improving liquid becomes ts≃2 μm.

[Example 9]

The head and its driving condition were the same as that of example 8. Accordingly, similarly to the example 8, $Re\cdot We=31752$ After printing the printing property improving liquid on the plain paper in 100% solid printing, the ink is ejected for printing at a timing where penetration of the printing property improving liquid is started and the thickness ts of the liquid layer of the printing property improving liquid becomes ts≃5 μm.

[Example 10]

While the head is the same as those of examples 3 to 9, the ink ejection characteristics are varied by employing a preparatory pulse in advance of the pulse for bubbling.

Ink Droplet Ejection Speed v=12.5 m/s

Ink Droplet Diameter d=37.5 μm

At this time, $Re=d\cdot v/\nu=259$ $We=\rho\cdot d\cdot v^2/\sigma=205$

Therefore, $Re\cdot We=53095$

After printing the printing property improving liquid on the plain paper in 100% solid printing, the ink is ejected for printing at a timing where penetration of the printing property improving liquid is started and the thickness ts of the liquid layer of the printing property improving liquid becomes ts≃2 μm.

[Example 11]

While the head is the same as those of examples 3 to 10, the ink ejection characteristics are varied by employing a preparatory pulse in advance of the pulse for bubbling.

Ink Droplet Ejection Speed: v=13.0 m/s

Ink Droplet Diameter: d=38.0 μm

At this time, $Re=d\cdot v/\nu=273$ $We=\rho\cdot d\cdot v^2/\sigma=225$

Therefore, Re·We=61425

The ink is directly ejected without ejecting the printing property improving liquid.

[Example 12]

The head and its driving condition were the same as that of example 8. Therefore, Re·We=31752

After printing the printing property improving liquid on the plain paper in 100% solid printing, the ink is ejected for printing at a timing where penetration of the printing property improving liquid is started and the thickness ts of the liquid layer of the printing property improving liquid becomes ts≃4 μm.

[Example 13]

The head and its driving condition were the same as that of example 8. Therefore, Re·We=31752

After printing the printing property improving liquid on the plain paper in 100% solid printing, the ink is ejected for printing at a timing where penetration of the printing property improving liquid is started and the thickness ts of the liquid layer of the printing property improving liquid becomes ts≃3 μm.

[Example 14]

While the head is the same as those of examples 3 to 9, the ink ejection characteristics are varied by employing a preparatory pulse in advance of the pulse for bubbling.

Ink Droplet Ejection Speed: v=11.6 m/s

Ink Droplet Diameter: d=37.0 μm

At this time, $Re=d\cdot v/\nu=237$ $We=\rho\cdot d\cdot v^2/\sigma=174$

Therefore, Re·We=41238

After printing the printing property improving liquid on the plain paper in 100% solid printing, the ink is ejected for printing at a timing where penetration of the printing property improving liquid is started and the thickness ts of the liquid layer of the printing property improving liquid becomes ts≃4 μm.

[Example 15]

The head and its driving condition were the same as that of example 8. Therefore, Re·We=41238

After printing the printing property improving liquid on the plain paper in 100% solid printing, the ink is ejected for printing at a timing where penetration of the printing property improving liquid is started and the thickness ts of the liquid layer of the printing property improving liquid becomes ts≃3 μm.

[Example 16]

The head and its driving condition were the same as that of example 10. Therefore, Re·We=53095

After printing the printing property improving liquid on the plain paper in 100% solid printing, the ink is ejected for printing at a timing where penetration of the printing property improving liquid id started and the thickness ts of the liquid layer of the printing property improving liquid becomes ts≃4 μm.

[Example 17]

The head and its driving condition were the same as that of example 10. Therefore, Re·We=53095

After printing the printing property improving liquid on the plain paper in 100% solid printing, the ink is ejected for printing at a timing where penetration of the printing property improving liquid is started and the thickness ts of the liquid layer of the printing property improving liquid becomes ts≃3 μm.

The results of printing of the foregoing examples 1 to 17 are shown in the following table. Evaluation of image quality is performed by sensory evaluation.

TABLE

| | Re · We | ts | Image Quality |
|---|---|---|---|
| Example 1 | 18079 | 10 μm | • |
| Example 2 | 18079 | 20 μm | • |
| Example 3 | 23739 | 10 μm | • |
| Example 4 | 23739 | 20 μm | Δ |
| Example 5 | 26593 | 5 μm | • |
| Example 6 | 26593 | 10 μm | Δ |
| Example 7 | 26593 | 20 μm | × |
| Example 8 | 31752 | 2 μm | • |
| Example 9 | 31752 | 5 μm | × |
| Example 10 | 53095 | 2 μm | • |
| Example 11 | 61425 | 0 μm | × |
| Example 12 | 31752 | 4 μm | Δ |
| Example 13 | 31752 | 3 μm | • |
| Example 14 | 41238 | 4 μm | × |
| Example 15 | 41238 | 3 μm | Δ |
| Example 16 | 53095 | 4 μm | × |
| Example 17 | 53095 | 3 μm | Δ |

•: quite high image quality with little splattering;
Δ: image quality is within an acceptable range, a splattering is caused slightly;
×: quite low image quality with significant splattering From the results set forth above, following can be concluded about splattering.

[1] Restricting Re·We<20000, no splattering is caused under the condition of 0<ts,

[2] 20000≦Re·We<25000, splattering is caused slightly under the condition of d/s<ts, For realizing higher image quality, it is necessary to satisfy the condition of d/2≦ts. In the foregoing inequality, d is a diameter of the ink droplet.

[3] 25000≦Re·We<29000, significant splattering is caused under the condition of ts<d/2, and image quality is not acceptable. Under the condition of ts<d/2, splattering is reduced and satisfactory for medium image quality.

For realizing higher image quality, it is necessary to satisfy the condition of ts<h/2. In the foregoing inequality, h is the maximum height of the ink abruptly spreading into disc shape immediately after impacting (see FIG. 1B).

[4] 29000≦Re·We<40000, significant splattering is cased under the condition of 4 μm<ts, and image quality is not acceptable. Under the condition of ts≦4 μm, splattering is reduced and the image quality becomes higher.

[5] 40000≦Re·We<55000, significant splattering is caused and image quality is not acceptable unless the condition of ts≦3 μm is satisfied.

[5] 60000≦Re·We, splattering is caused even when the printing property improving liquid is not applied.

Except for the example 11, 0<ts in all of examples. Under this condition, no feathering and bleeding are caused and a substantially circular high density dot can be formed, Needless to say, in these examples, substantially complete water-resistance could be achieved.

Accordingly, by applying the printing property improving liquid on the printing and then impacting the ink, substantially circular high density dot can be formed without causing feathering, bleeding and splattering under any one of the following formulae (1'), (1"), (2) to (5). Thus, quite high quality and substantially completely water-resistant image can be formed.

$Re \cdot We < 200000$ and $0 < ts$ Formula (1')

$20000 \leqq Re \cdot We < 25000$ and $0 < ts$ or $0 < ts < d/2$ Formula (1")

$25000 \leqq Re \cdot We < 29000$ and $0 < ts < d/2$ or $0 < ts < h/2$ Formula (2)

$29000 \leqq Re \cdot We < 40000$ and $0 < ts < d/2$ or $0 < ts < h/2$ Formula (3)

$40000 \leqq Re \cdot We < 55000$ and $0 < ts \leqq 3\ \mu m$ Formula (4)

$55000 \leqq Re \cdot We < 60000$ and $0 < ts \leqq 2\ \mu m$ Formula (5)

One example of the printing apparatus which can realize respective of the foregoing examples will be discussed.

Figure 2:
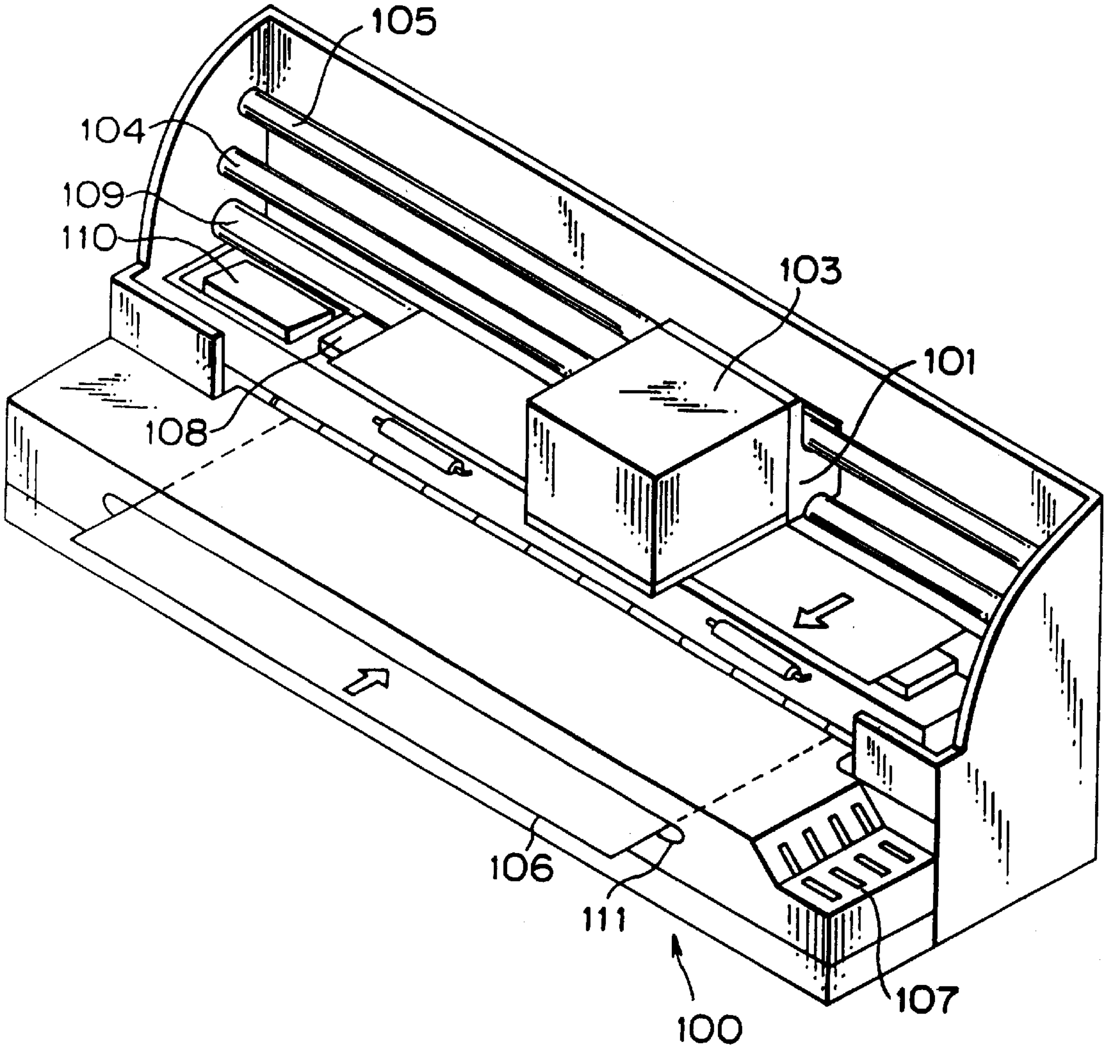
FIG. 2 is a general perspective view showing one embodiment of an ink jet printing apparatus of the present invention.

FIG. 2 is a perspective view generally showing one embodiment of an ink jet printing apparatus according to the invention.

In an ink jet printing apparatus 100, a carriage 101 slidably engages with two guide shafts 104 and 105 extending in parallel to each other. By this, the carriage 101 can be driven to shift along the guide shafts 104 and 105 by a drive motor and a driving force transmission mechanism (both are not shown) for transmitting the driving force of the drive motor. On the carriage 101, an ink jet unit 103 having an ink jet head and an ink tank as an ink container for storing an ink to be used in the head, is mounted.

The ink jet unit 103 comprises a plurality of heads for ejecting the ink or a printing property improving liquid for improving water resistance or printing property, and tanks as a container for storing an ink or the printing property improving liquid to be supplied to the heads. Namely, five heads in total for respectively ejecting a black (Bk), magenta (M), yellow (Y) and a cyan (C) of four colors of inks, and, in addition for ejecting the above-mentioned printing property improving liquid, and the tanks corresponding to respective heads are mounted on the carriage 101 as the ink jet unit 103. Each head and the corresponding tank are mutually detachable from each other so that when the ink or the printing property improving liquid in the tank is depleted or so forth, only the emptied tank can be exchanged independently, as required. Also, it is of course possible to exchange only head as required. It should be noted that construction for attaching and detaching of the head and the tank is not specified to the shown example, and the head and tank may also be formed integrally.

On the other hand, the improvement of the printing property of the printing property improving liquid, as discussed in terms of one example, the passage includes in the meaning to enhance density, chroma, degree of sharpness at the edge portion, dot diameter and so forth to be factors of the image quality, improvement of ink fixing ability and improvement of weather-resistance, such as water resistance, light resistance and so forth, namely, improvement of fastness or durability of the image. For this reason, the printing property improving liquid may be occasionally referred to as printing property improving printing property improving liquid.

A paper 106 as a printing medium is inserted through an insertion opening 111 provided at the front end portion of the apparatus, reversed in a feeding direction and fed to the lower portion of the motion range of the carriage 101 by a feed roller 109. By this, from the heads mounted on the carriage 101, inks are ejected on the paper 106 supported on a platen 108 associating with motion of the head to perform printing in a printing region.

As set forth above, by alternately repeating printing in a width corresponding to the width of ejection opening array of the head and feeding of the paper 106, printing is performed on overall paper 106. The paper 106 is then discharged from the front side of the apparatus.

In a region at left side end of the motion stroke of the carriage 101, a recovery unit 110 which can be opposed to respective head of the carriage 101 from the lower side, is provided. By this, an operation for capping respective ejection openings of the ejection heads in non-printing state and sucking ink from ejection openings of respective heads can be performed. Also, the predetermined position at the left side end is set as a home position of the head.

Figure 3:
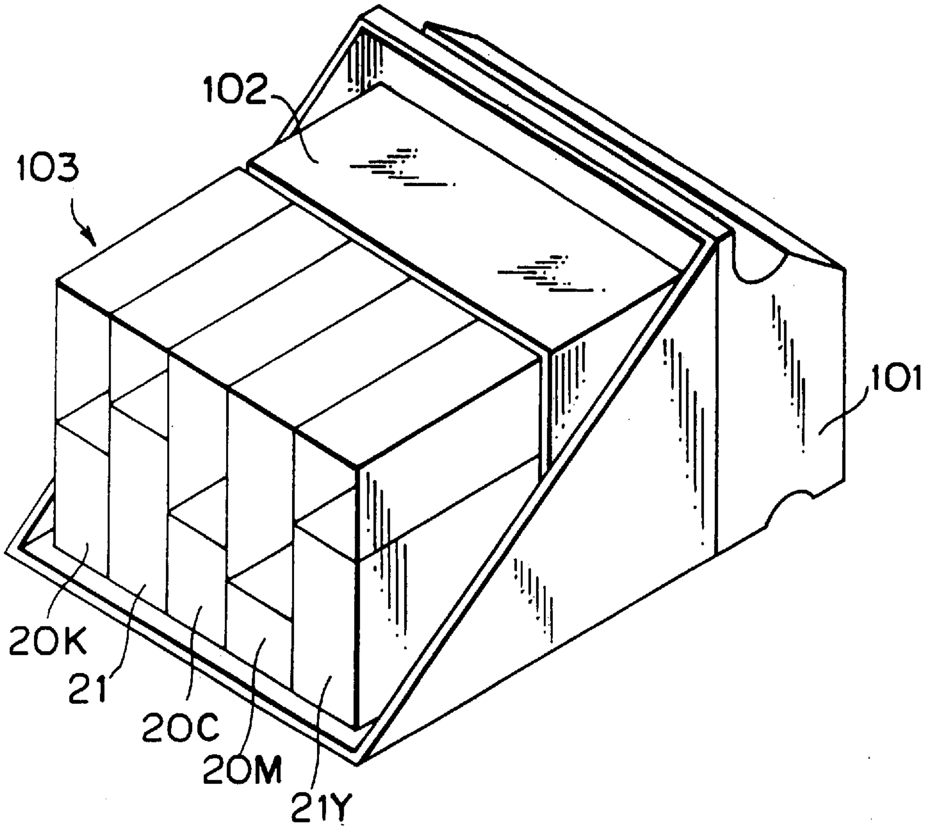
FIG. 3 is a general perspective view showing an ink jet unit of FIG. 2.

FIG. 3 is a general perspective view showing the ink jet unit 103 explained with respect to FIG. 1. In the shown construction, respective tanks of black (Bk), magenta (M), yellow (Y) and cyan (C) color inks and the printing property improving liquid can be exchanged independently.

Namely, in order to detachably load each head independently, a head casing 102 and Bk ink tank 20K, C ink tank 20C, M ink tank 20M and Y ink tank 20Y are mounted on the carriage 101. In the head casing 102, heads 30K, 30C, 30M and 30Y (not shown in FIG. 3) for respectively ejecting Bk, C, M and Y inks, and a head 31 (not shown in FIG. 3) for ejecting the printing property improving liquid are loaded. Each of heads 30K and 31 are provided with 160 ejection openings. On the other hand, each of the heads 30Y, 30M and 30C are provided with 48 ejection openings. Through respective ejection openings, 40 ng of inks or printing property improving liquid are ejected. Respective tanks are connected to heads via connecting portions and supply inks. Also, respective tanks are formed of transparent material so that remaining level of the ink or the printing property improving liquid therein may be checked.

It should be noted that as a construction of the tank, it is possible that the tanks for the printing property improving liquid and the Bk ink may be integral in structure. Also, the tanks for C, M, Y may be integral.

Figure 4:
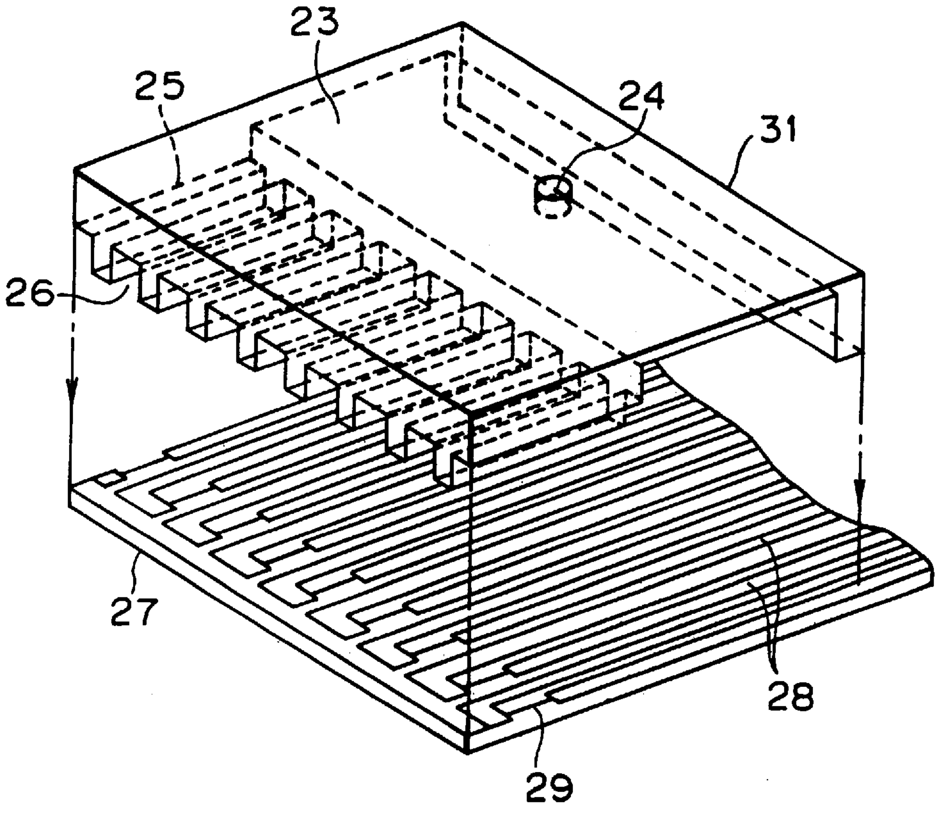
FIG. 4 is a perspective view showing an ink jet printing head which can be loaded in the ink jet printing apparatus of FIG. 2.

FIG. 4 is a perspective view showing an ink jet printing head which can be loaded in the ink jet printing apparatus of FIG. 2. In FIG. 4, reference numeral 27 denotes a heater board. The heater board 27 has a silicon substrate, an electro-thermal transducer (ejection heater) 29 formed on the silicon substrate, and a wiring 28 made of aluminum and so on for supplying an electric power to the electro-thermal transducer 29, the wiring 28 and the electro-thermal transducer 29 being formed by thin-layer forming technology. An ink jet printing head includes the heater board 27 and a ceiling plate 30 being bonded to the heater board 27, the ceiling plate 30 having a plurality of walls for forming a plurality of liquid paths 25.

A liquid (ink) used for printing is fed to a common liquid space 23 through a feed port 24 which is arranged on the ceiling plate 30, and is fed from the common liquid space 23 to respective nozzles 25. When the heater 27 is heated by turning on the electric power, a bubble in ink filled within the nozzle 29 is instantly generated, and an ink is ejected by virture of pressure of the bubble from an ejection port 26 which is arranged at the end of the nozzle 29.

Figure 5:
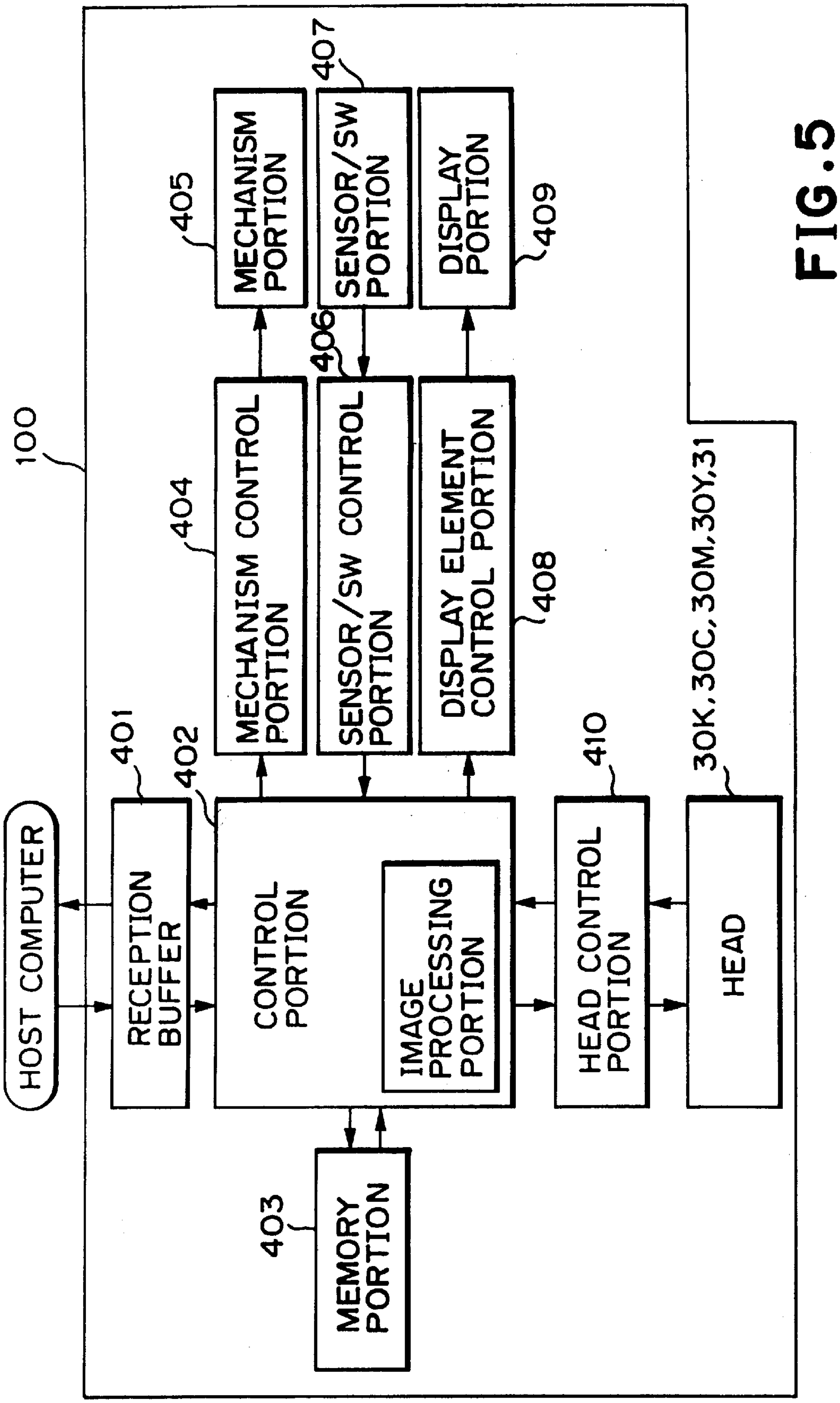
FIG. 5 is a block diagram showing a construction of the control system of the ink jet printing apparatus according to the invention.

FIG. 5 is a block diagram showing a construction of the control system in one embodiment of the ink jet printing apparatus according to the invention.

In FIG. 5, data with respect to characters and images to be printed (hereinafter referred as image data) are inputted from a host computer to a reception buffer 401 of a printing apparatus 100. Data for confirming whether or not a data is correctly redirected, and data for notifying a state of operation in the printing apparatus are redirected from the printing apparatus toward the host computer. Under the control of a control portion 402 having a CPU or central processing unit, data inputted to the reception buffer 401 is redirected to a memory portion 403 in a form of RAM and is temporarily stored therein. A mechanical control portion 404 drives a mechanical portion 405 such as a carriage motor and a line feed roller, as a driver for driving a carriage 101 and a feed roller 109 (see FIG. 2) by an order from the control portion 402. A sensor/SW control portion 406 redirects a signal from a sensor/SW portion 407 to the control portion 402, the sensor/SW portion 407 including a kind of sensor and SW (switches). A display element control portion 408 controls a display of a display element portion 409 by an order from the control portion 402, the portion 409 including a group of display panels and liquid crystal display elements. A head control portion 410 individually controls heads 30K, 30C, 30M, 30Y and 31 by an order from the control portion 402. The head control portion 410 reads individual information with respect to temperature indicating state of each head above, and redirects the information to the control portion 402.

Here, as an example, the printing property improving liquid or solution for making ink dyestuff insoluble can be obtained in the following manner.

Specifically, the following components are mixed together and dissolved, and the mixture is pressure-filtered by using a membrane filter of 0.22 $\mu$m in pore size (tradename: Fuloro-pore filter prepared by Sumitomo Electric Industries, Ltd.), and thereafter, pH of the mixture is adjusted to a level of 4.8 by adding sodium hydroxide whereby printing property improving liquid P can be obtained.

[components of the liquid P]

Low molecular weight ingredients of cationic compound;

Stearyl-trimethyl ammonium salts (tradename: Electrostriper QE, prepared by Kao Corporation), or Stearyl-trimethyl ammonium chloride (tradename: Yutamine 86P, prepared by Kao Corporation) 2.0 parts by weight High molecular weight ingredients of cationic compound;

Copolymer of diarylamine hydrochloride and Sulfur dioxide (having an average molecular weight of 5000) (tradename: Polyaminesulfon PAS-92, prepared by Nitto Boseki Co., Ltd) 3.0 parts by weight Thiodiglycol; 10 parts by weight Water balance Preferable examples of ink which becomes insoluble by mixing the aforementioned printing property improving liquid can be noted below.

Specifically, the following components are mixed together, the resultant mixture is pressure-filtered with the use of a membrane filter of 0.22 $\mu$m in pore size (tradename: Fuloro-pore filter, prepared by Sumitomo Electric Industries, Ltd.) so that yellow ink Y1, magenta ink M1, cyan ink C1 and black ink Bk1 can be obtained.

Y1

Dyestuff, C. I. direct yellow 142 2 parts by weight

Thiodiglycol 10 parts by weight

Acetylenol EH (prepared by Kawa-ken Fine Chemical Co., Ltd.) 0.05 parts by weight Water balance

M1

This ink has the same composition as that of Y1 except that the dyestuff is changed to 2.5 parts by weight of C. I. acid red 289.

C1

This ink has the same composition as that of Y1 except that the dyestuff is changed to 2.5 parts by weight of acid blue 9.

Bk1

This ink has the same composition as that of Y1 except that the dyestuff is changed to 3 parts by weight of C. I. food black 2.

According to the present invention, the aforementioned printing property improving liquid (liquid composition) and ink are mixed with each other at the position on the printing medium or at the position where they penetrate in the printing medium. As a result, the ingredient having a low molecular weight or cationic oligomer among the cationic material contained in the printing property improving liquid and the water soluble dye used in the ink having anionic radical are associated with each other by an ionic mutual function as a first stage of reaction whereby they are instantaneously separated from the solution liquid phase.

Next, since the associated material of the dyestuff and the cationic material having a low molecular weight or cationic oligomer are adsorbed by the ingredient having a high molecular weight contained in the printing property improving liquid as a second stage of reaction, a size of the aggregated material of the dyestuff caused by the association is further increased, causing the aggregated material to hardly enter fibers of the printed material. As a result, only the liquid portion separated from the solid portion permeates into the printed paper, whereby both high print quality and a quick fixing property are obtained. At the same time, the aggregated material formed by the ingredient having a low molecular weight or the cationic oligomer of the cationic material and the anionic dye by way of the aforementioned mechanism, has increased viscosity. Thus, since the aggregated material does not move as the liquid medium moves, ink dots adjacent to each other are formed by inks each having a different color at the time of forming a full colored image but they are not mixed with each other. Consequently, a malfunction such as bleeding does not occur. Furthermore, since the aggregated material is substantially water-insoluble, water resistibility of a formed image is complete. In addition, light resistibility of the formed image can be improved by the shielding effect of polymer.

By the way, the term "insoluble" or "aggregation" refers to observable events in only the above first stage or in both the first and second stages.

When the present invention is carried out, since there is no need of using the cationic material having a high molecular weight and polyvalent metallic salts like the prior art or even though there is need of using them, it is sufficient that they are assistantly used to improve an effect of the present invention, a quantity of usage of them can be minimized. As a result, the fact that there is no reduction of a property of color exhibition that is a problem in the case that an effect of water resistibility is asked for by using the conventional cationic high molecular weight material and the polyvalent metallic salts can be noted as another effect of the present invention.

With respect to a printing medium usable for carrying out the present invention, there is no specific restriction, so called plain paper such as copying paper, bond paper or the like conventionally used can preferably be used. Of course, coated paper specially prepared for ink jet printing and OHP transparent film are preferably used. In addition, ordinary high quality paper and bright coated paper can preferably be used.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system, are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for performing preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the temperature of the ink is generally adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on impacting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

Figure 6:
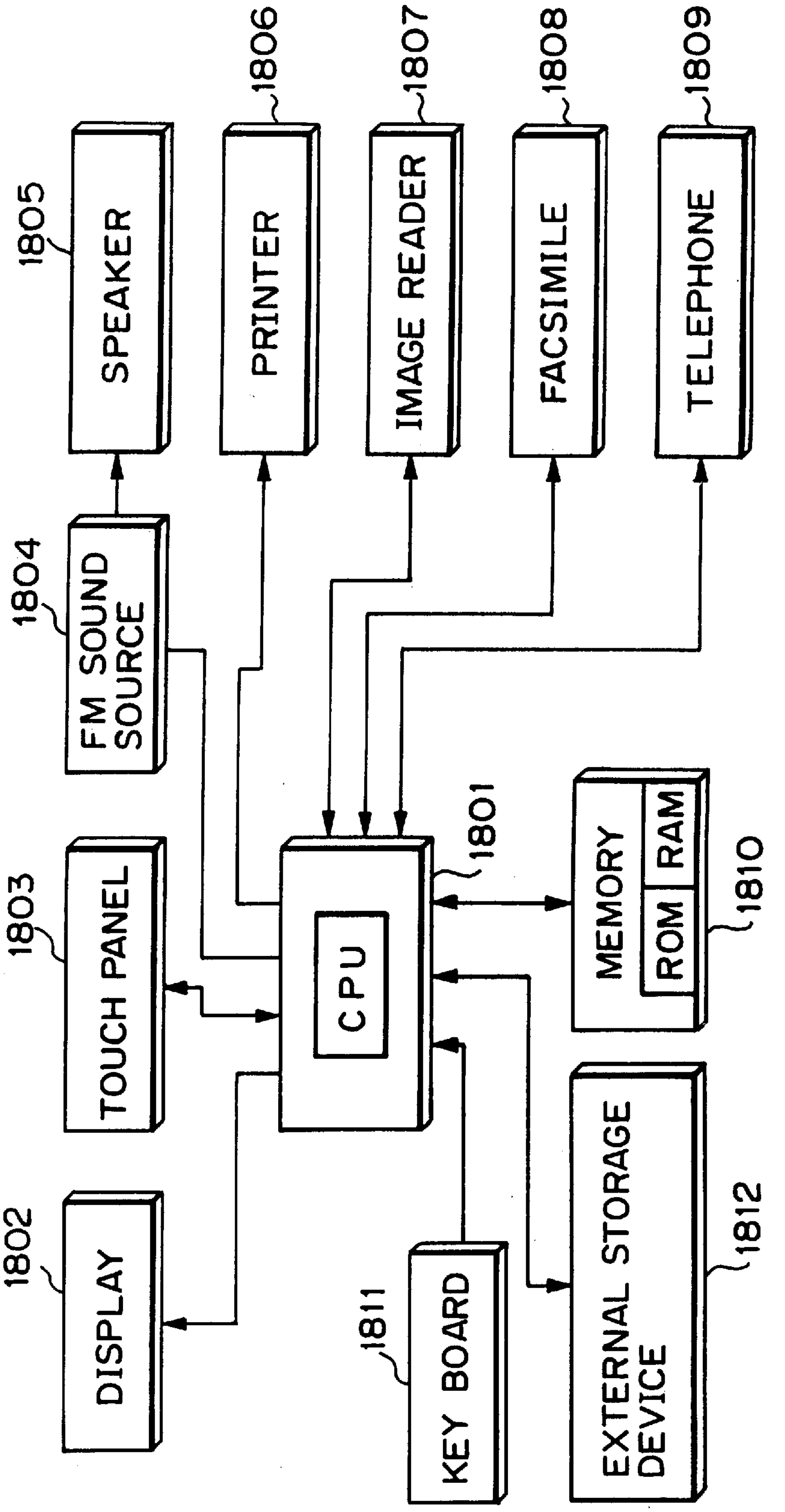
FIG. 6 is a block diagram showing a general construction, in which the printing apparatus according to the present invention is applied to an information processing system including functions as a word-processor, a personal computer, a facsimile machine and a copy machine.

FIG. 6 is a block diagram showing general construction of an information processing apparatus having a function of wordprocessor, personal computer, facsimile machine, a copy machine and so forth, to which the printing apparatus according to the present invention is applied.

In the drawings, a reference numeral 1801 denotes a control portion performing control of the overall apparatus, which includes CPU, such as microprocessor and so forth, and various I/O ports, to perform control for outputting control signal or data signal and so forth to respective portions and inputting control signal or data signal from the respective portions. A reference numeral 1802 denotes a display portion having a display screen, on which various menu, document information and image or so forth read by an image reader 1807 are displayed. A reference numeral 1803 denotes a transparent pressure sensitive touch panel provided on the display portion 1802 for performing item entry or coordinate portion entry on the display portion 1802 by depressing the surface thereof by a finger or so forth.

A reference numeral 1804 denotes an FM or frequency modulation sound source portion which stores music information produced by a music editor and so forth in a memory portion 1810 or an external memory 1812 and performs FM modulation by reading out the stored music information from the memory portion or so forth. An electric signal from the FM sound source portion 1804 is transformed into an audible sound by a speaker portion 1805. A printer portion 1806 is employed as an output terminal of the wordprocessor, the personal computer, the facsimile machine, the copy machine and so forth, in which the printing apparatus according to the present invention is applied.

A reference numeral 1807 denotes an image reader portion for optoelectrically reading out an original data for inputting, which is located at the intermediate position in an original feeding path and performs reading of various original documents, such as original document for facsimile machine or copy machine. A reference numeral 1808 denotes a FAX or facsimile transmission and reception portion for transmitting original data read by the image reader portion or for receiving transmitted facsimile signal, which facsimile transmission and reception portion has an external interface function. A reference numeral 1809 denotes a telephone machine portion having a normal telephone function and various associated functions, such as a recording telephone and so forth.

A reference numeral 1810 denotes a memory portion including a ROM storing a system program, a manager programs, other application program and so forth, as well as character fonts, dictionary and so forth, a RAM for storing application program loaded from an external storage device 1812, document information, video information and so forth.

A reference numeral 1811 denotes a keyboard portion inputting document information or various commands. A reference numeral 1812 denotes the external storage device employing a floppy disc or hard disc drive as storage medium. In the external storage device 1812, document information, music or speech information, application program of the user and so forth are stored.

Figure 7:
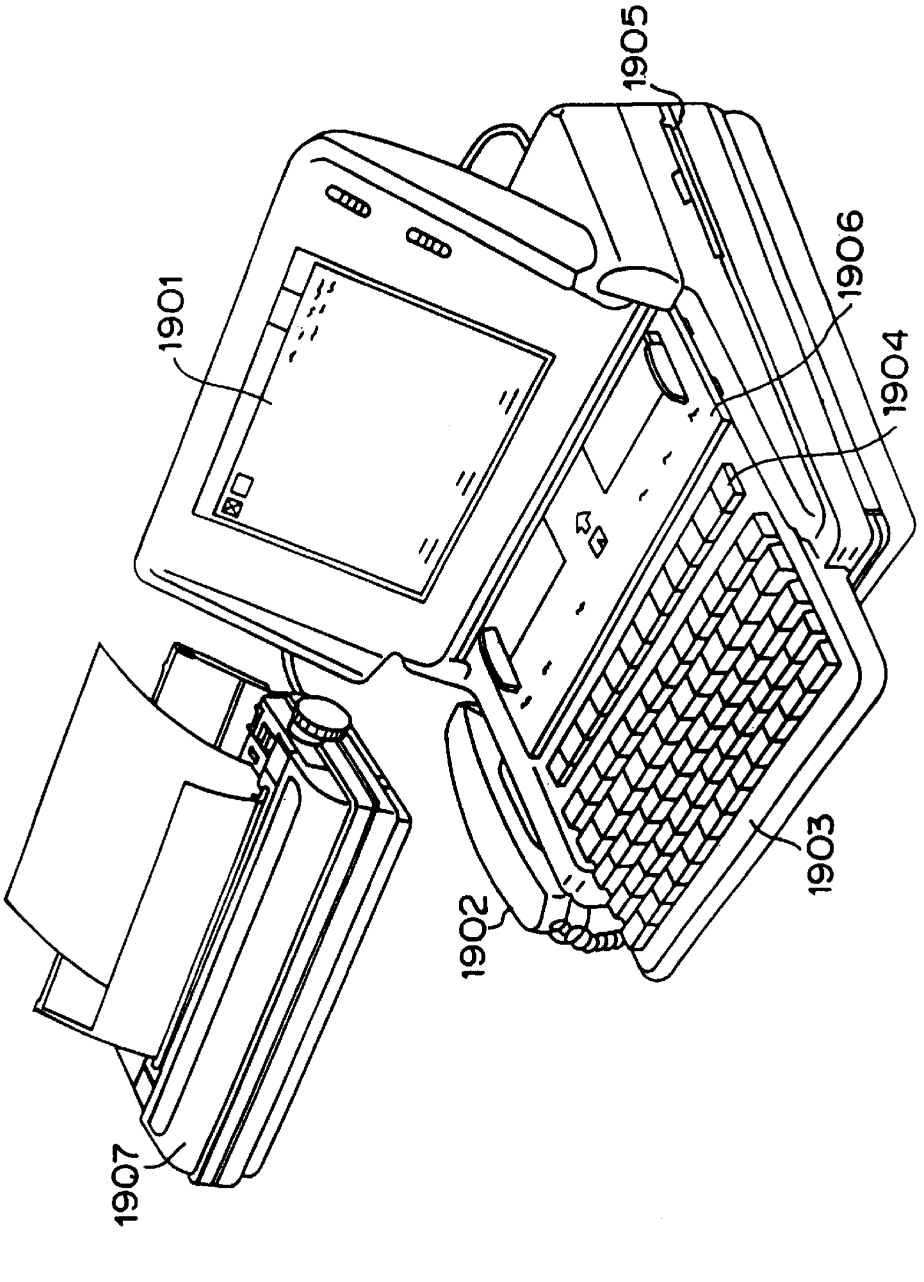
FIG. 7 shows a diagrammatic external view of the information processing system shown in FIG. 6.

FIG. 7 is a diagrammatic external view of the information processing system shown in FIG. 6.

In FIG. 7, a reference numeral 1901 denotes a flat panel display utilizing a liquid crystal and so forth. On this display, the touch panel 1803 is overlaid so that coordinate position input or item designation input can be performed by depressing the surface of the touch panel 1803 by a finger or so forth. A reference numeral 1902 denotes a handset to be used when a function as the telephone machine of the apparatus is used. A keyboard is detachably connected to a main body of the apparatus through a cable and adapted to permit entry of various document information or various data input. On the other hand, on the keyboard 1903, various function keys and so forth are arranged. A reference numeral 1905 denotes an insertion mouth of the external storage device 1812 for accommodating a floppy disk inserted thereinto.

A reference numeral 1906 denotes a paper stacking portion for stacking the original to be read by the image reader portion 1807. The original read by the image reader portion is discharged from the back portion of the apparatus. On the other hand, in facsimile reception, the received information is printed by the ink jet printer 1907.

It should be noted that while the display portion 1802 may be a CRT, it is desirable to employ a flat display panel, such as a liquid crystal display employing a ferrodielectric liquid crystal for capability of down-sizing and reduction of thickness as well as reduction of weight.

When the information processing apparatus as set forth above is operated as the personal computer or the wordprocessor, various information input through the keyboard portion 1811 is processed according to a predetermined program by the control portion 1801 and output as printed image by the printer portion 1806.

When the information processing apparatus is operated as a receiver of the facsimile machine, facsimile information input from the FAX transmission and reception portion 1808 via a communication network is subject reception process according to the predetermined program and output as received image by the printer portion 1808.

In addition, when the information processing apparatus is operated as a copy machine, the original is read by the image reader portion 1807 and the read original data is output to the printer portion as copy image via the control portion 1801. It should be noted that, when the information processing apparatus is used as the transmitter of the facsimile machine, the original data read by the image reader 1807 is processed for transmission according to the predetermined program by the control portion, and thereafter transmitted to the communication network via the FAX transmission and reception portion 1808.

Figure 8:
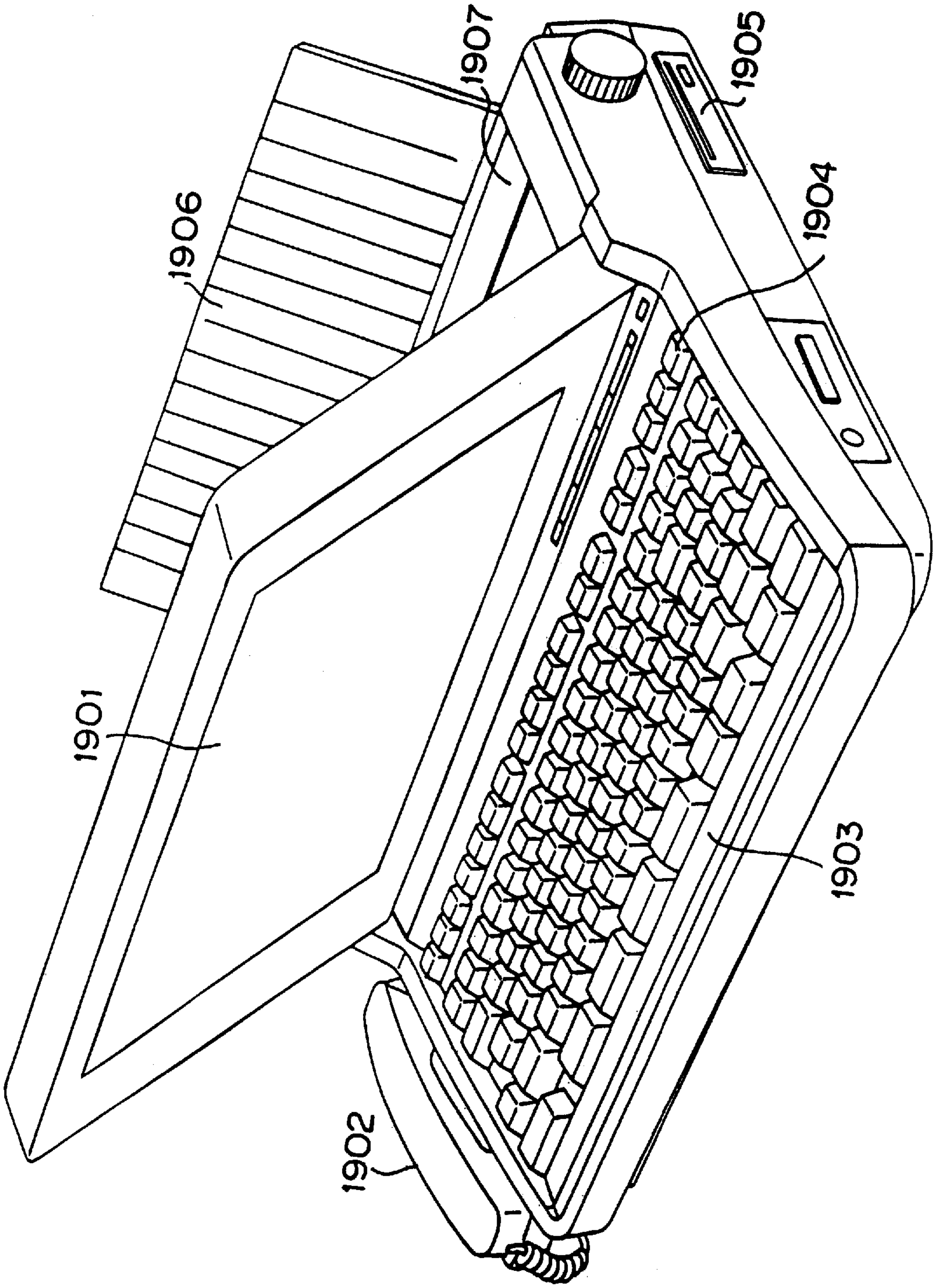
FIG. 8 shows a diagrammatic external view of one example of application of the printing apparatus of the present invention to the information processing system.

It should be noted that the information processing apparatus may be an integrated type incorporating the ink jet printer within a main body as illustrated in FIG. 8. In this case, portability can be further improved. In FIG. 8, the portions having the same functions as those in to FIG. 7 are shown with the corresponding reference numerals.

As set forth above, a multi-function type information processing apparatus may obtain high quality printed image at high speed and low noise by employing the printing apparatus of the present invention. Therefore, the functions of the information processing apparatus can be further enhanced.

As set forth above, according to the present invention, upon forming an image by ejecting the ink to the printing medium, to which the printing property improving liquid containing a compound for coagulating the coloring agent or for making the coloring agent insoluble, is applied, the region of the printing medium to be covered with the ink when the ink droplet is ejected and hit thereon, is covered with the layer of the printing property improving liquid. At this time, the thickness of the layer of the printing property improving liquid is assumed as ts, the diameter of the ink droplet is assumed as d, the ejection speed is assumed as v, and a substantially circular, high density dot can be formed without causing splattering, feathering, bleeding by impacting the ink droplet onto the printing medium under the condition satisfying one of the following formulae:

$$Re \cdot We < 25000 \text{ and } 0 < ts \quad \text{Formula (1)}$$

$$25000 \leq Re \cdot We < 29000 \text{ and } 0 < ts < d/2 \quad \text{Formula (2)}$$

$$29000 \leq Re \cdot We < 40000 \text{ and } 0 < ts \leq 4\ \mu m \quad \text{Formula (3)}$$

$40000 \leq Re \cdot We < 55000$ and $0 < ts \leq 3\ \mu m$ Formula (4)

$55000 \leq Re \cdot We < 60000$ and $0 < ts \leq 2\ \mu m$ Formula (5)

wherein $Re = d \cdot v / \nu$ $We = \rho \cdot d \cdot v^2 / \sigma$

ν: kinetic viscosity of ink

σ: surface tension of ink

ρ: density of ink

On the other hand, according to the present invention, in $20000 \leq Re \cdot We < 25000$, before the timing of impacting the ink to the printing medium, by providing the thickness of the printing property improving liquid layer in a range of $0 < ts < d/s$, high quality image printing becomes possible in the above-identified range of Re·We.

Also, according to the present invention, if $25000 \leq Re \cdot We < 29000$, before the timing of impacting the ink to the printing medium, by providing the thickness of the printing property improving liquid layer in a range of $0 < ts < h/2$, high quality image printing becomes possible in the above-identified range of Re·We.

The present invention has been described in detail with respect to preferred embodiments, and it will now be that changes and modifications may be made without departing from the invention in its broader aspects, and it is the invention, therefore, in the appended claims to cover all such changes and modifications as fall within the true spirit of the invention.

What is claimed is:

1. An ink jet printing method for forming an image, said method comprising the steps of:

ejecting a printing property improving liquid, which improves printing property of ejected ink, onto a printing medium in advance of ejection of the ink onto the printing medium; and ejecting the ink to the printing property improving liquid applied on the printing medium, wherein the ink is impact on a region of the printing medium to be covered with the ink under a condition satisfying any one of the following conditions (1) to (5):

(1) $Re \cdot We < 25000$ and $0 < ts$ (2) $25000 \leq Re \cdot We < 29000$ and $0 < ts < d/2$ (3) $29000 \leq Re \cdot We \leq 40000$ and $0 < ts \leq 4\ \mu m$ (4) $4000 \leq Re \cdot We < 55000$ and $0 < ts \leq 3\ \mu m$ (5) $55000 \leq Re \cdot We < 60000$ and $0 < ts \leq 2\ \mu m$, wherein $Re = d \cdot v / \nu$ $We = \rho \cdot d \cdot v^2 / \sigma$ ts: a thickness of a liquid layer of the printing property improving liquid covering the region of the printing medium to be covered with the ink after impacting the ink thereon at the moment of the ink impact on the printing medium d: a diameter of an elected ink droplet v: ink election speed ν: kinetic viscosity of ink σ: surface tension of ink ρ: density of ink.

2. An ink jet printing method as claimed in claim 1, wherein when the ink is impacted in the condition satisfying $20000 \leq Re \cdot We < 25000$, the thickness ts of the printing property improving liquid layer is in a range of $0 < ts < d/2$.

3. An ink jet printing method as claimed in claim 1, wherein when the ink is impacted in the condition satisfying $25000 \leq Re \cdot We < 29000$, the thickness ts of the printing property improving liquid layer is in a range of $0 < ts < h/2$, wherein h is a maximum height of the ink to be abruptly dispersed in disk shaped configuration immediately after impacting on the printing medium.

4. An ink jet printing method as claimed in claim 1, wherein ts is an average thickness of the liquid layer of the printing property improving liquid in the region of the printing medium to be covered with the ink after impacting the ink thereon.

5. An ink jet printing method as claimed in claim 1, wherein an electromechanical transducer is employed as means for ejecting the ink and the printing property improving liquid.

6. An ink jet printing method as claimed in claim 1, wherein an electro-thermal transducer is employed as means for ejecting the ink and the printing property improving liquid.

7. An ink jet printing method as claimed in claim 1, wherein a combination of an electromechanical transducer and an electro-thermal transducer is employed as means for ejecting the ink and the printing property improving liquid.

8. An ink jet printing method as claimed in claim 1, wherein the printing property improving liquid contains low molecular weight cation material and high molecular weight cation material, and the ink contains an anionic dyestuff.

9. An ink jet printing method as claimed in claim 1, wherein the printing property improving liquid contains low molecular weight cationic substance and high molecular weight cationic substance, and the ink at least contains anionic compound and a pigment.

10. An ink jet printing apparatus for forming an image by ejecting a printing property improving liquid, which improves printing property of ejected ink, from a printing property improving liquid ejecting portion onto a printing medium in advance of ejection of the ink onto the printing medium, and ejecting the ink from an ink ejecting portion to the printing property improving liquid applied on the printing medium, said apparatus comprising:

an ejection controller for ejecting the ink onto a region of the printing medium to be covered therewith under a condition satisfying any one of the following conditions (1) to (5):

(1) $Re \cdot We < 25000$ and $0 < ts$ (2) $25000 \leq Re \cdot We < 29000$ and $0 < ts < d/2$ (3) $29000 \leq Re \cdot We < 40000$ and $0 < ts \leq 4\ \mu m$ (4) $40000 \leq Re \cdot We < 55000$ and $0 < ts \leq 3\ \mu m$ (5) $55000 \leq Re \cdot We < 60000$ and $0 < ts \leq 2\ \mu m$, wherein $Re = d \cdot v / \nu$ $WE = \rho \cdot d \cdot v^2 / \sigma$ ts: a thickness of a liquid layer of the printing property improving liquid covering the region of the printing medium to be covered with the ink after impacting the ink thereon at the moment of the ink impact on the printing medium d: a diameter of an ejected ink droplet v: ink ejection speed ν: kinetic viscosity of ink σ: surface tension of ink ρ: density of ink.

11. An ink jet printing apparatus as claimed in claim 10, wherein the ink ejecting portion is reciprocally movable on the printing medium.

12. An ink jet printing apparatus as claimed in claim 11, wherein the ink ejecting portion and the printing property improving liquid ejecting portion are arranged in the reciprocating direction.

13. An ink jet printing apparatus as claimed in claim 10, wherein the ink ejecting portion and the printing property improving liquid ejecting portion have thermal energy generating bodies for providing thermal energy for ejection of the ink and the printing property improving liquid.

14. An image forming apparatus, comprising:

an ink jet printing apparatus for forming an image by ejecting a printing property improving liquid, which improves printing property of ejected ink, from a printing property improving liquid ejecting portion onto a printing medium in advance of ejection of the ink onto the printing medium, and ejecting the ink from an ink ejecting portion to the printing property improving liquid applied on the printing medium;

an ejection controller for ejecting the ink onto a region of the printing medium to be covered therewith under a condition satisfying any one of the following conditions (1) to (5):

(1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts < 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$, wherein $Re = d \cdot v / \nu$ $We = \rho \cdot d \cdot v^2 / \sigma$ ts: a thickness of a liquid layer of the printing property improving liquid covering the region of the printing medium to be covered with the ink after impacting the ink thereon at the moment of the ink impact on the printing medium d: a diameter of an elected ink droplet v: ink election speed ν: kinetic viscosity of ink σ: surface tension of ink ρ: density of ink;

a receiver for receiving image data from an external device; and an image data supplier for supplying the image data obtained through the receiver to the ink jet printing apparatus.

15. An image forming apparatus, comprising:

an ink jet printing apparatus for forming an image by ejecting a printing property improving liquid which improves printing property of ejected ink, from a printing property improving liquid ejecting portion onto a printing medium in advance of ejection of the ink onto the printing medium, and ejecting the ink from an ink ejecting portion to the printing property improving liquid applied on the printing medium;

an ejection controller for ejecting the ink onto a region of the printing medium to be covered therewith under a condition satisfying any one of the following conditions (1) to (5):

(1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts \leqq 4\ \mu m$ (4) $40000 \leqq Re \cdot We < 55000$ and $0 < ts < 3\ \mu m$ (5) $55000 \leqq Re \cdot We < 60000$ and $0 < ts \leqq 2\ \mu m$, wherein $Re = d \cdot v / \nu$ $We = \rho \cdot d \cdot v^2 / \sigma$ ts: a thickness of a liquid layer of the printing property improving liquid covering the region of the printing medium to be covered with the ink after impacting the ink thereon at the moment of the ink impact on the printing medium d: a diameter of an ejected ink droplet v: ink ejection speed ν: kinetic viscosity of ink σ: surface tension of ink ρ: density of ink;

a reader for reading an image;

an image data supplier for supplying the image data obtained through the reader to the ink jet printing apparatus.

16. An apparatus as claimed in claim 10, wherein the printing apparatus is constructed to be used as a terminal for a computer.

17. An apparatus as claimed in claim 10, wherein the printing apparatus is constructed to be used in a copying machine.

18. An apparatus as claimed in claim 10, wherein the printing apparatus is constructed to be used in a facsimile machine.

19. A printed product obtained by implementing an ink jet printing method for forming an image by ejecting a printing property improving liquid, which improves printing property of ejected ink, onto a printing medium in advance of ejection of the ink onto the printing medium, and ejecting the ink to the printing property improving liquid applied on the printing medium, wherein the ink is impacted on a region of the printing medium to be covered with the ink under a condition satisfying any one of the following conditions (1) to (5):

(1) $Re \cdot We < 25000$ and $0 < ts$ (2) $25000 \leqq Re \cdot We < 29000$ and $0 < ts < d/2$ (3) $29000 \leqq Re \cdot We < 40000$ and $0 < ts \leqq 4\ \mu m$ (4) $40000 \leqq Re \cdot We < 55000$ and $0 < ts \leqq 3\ \mu m$ (5) $55000 \leqq Re \cdot We < 60000$ and $0 < ts \leqq 2\ \mu m$, wherein $Re = d \cdot v / \nu$ $We = \rho \cdot d \cdot v^2 / \sigma$ ts: a thickness of a liquid layer of the printing property improving liquid covering the region of the printing medium to be covered with the ink after impacting the ink thereon at the moment of the ink impact on the printing medium d: a diameter of an ejected ink droplet v: ink election speed ν: kinetic viscosity of ink σ: surface tension of ink ρ: density of ink.

* * * * *

UNITED STATES PATENT AND TRADEMARK OFFICE

CERTIFICATE OF CORRECTION

PATENT NO. : 5,805,190

DATED : September 8, 1998

INVENTORS : TSUCHII, ET AL.

It is certified that error appears in the above-identified patent and that said Letters Patent is hereby corrected as shown below:

COLUMN 1,
Line 57, "In" should read --For--; and
Line 59, "becomes" should read --become--.

COLUMN 4,
Line 7, "Thickness" should read --Thickness ts--.

COLUMN 6,
Line 8, "an" should read --a--. (first occurrence)

COLUMN 7,
Line 50, "cross sectional" should read --cross-sectional--.

COLUMN 8,
Line 53, "avoiding" should read --avoided--.

COLUMN 9,
Line 2, "to urge a" should read --to be urged--;
Line 5, "back side" should read --backside--;
Line 21, "cross section" should read --cross-section--;
Line 23, "Lout" should read --$L_{out}$--; and
Line 24, "Lin" should read --$L_{in}$--.

UNITED STATES PATENT AND TRADEMARK OFFICE

CERTIFICATE OF CORRECTION

PATENT NO. : 5,805,190

DATED : September 8, 1998

INVENTORS : TSUCHII, ET AL.

It is certified that error appears in the above-identified patent and that said Letters Patent is hereby corrected as shown below:

COLUMN 10,
Line 20, "Kinetic viscosity$\nu$ =$\eta/\rho$0.018 $cm^2/s$" should read --Kinetic viscosity $\nu=\eta/\rho=0.018$ $cm^2/s$--.

COLUMN 11,
Line 13, "cross section" should read --cross-section--, and "that" should read --that of--.

COLUMN 14,
Line 7, "id" should read --is--;
Line 61, "cased" should read --caused--.

COLUMN 15,
Line 5, "formed," should read --formed.--; and
Line 15,
"Re·We<200000 and 0<ts Formula (1')"
should read
--Re·We<20000 and 0<ts Formula (1')--.

COLUMN 16,
Line 2, "printing property" (second occurrence) should be deleted; and
Line 3, "improving" should be deleted.

COLUMN 17,
Line 2, "virture" should read --virtue--;
Line 56, "Thiodiglycol;" should read Thiodiglycol:--; and
Line 57, "Water balance" should read --Water: balance--.

UNITED STATES PATENT AND TRADEMARK OFFICE
CERTIFICATE OF CORRECTION

PATENT NO. : 5,805,190

DATED : September 8, 1998

INVENTORS : TSUCHII, ET AL.

It is certified that error appears in the above-identified patent and that said Letters Patent is hereby corrected as shown below:

COLUMN 18,
Line 1, "Y1" should read --Y1:--;
Line 2, "C.I. direct yellow 142" should read --C.I. direct yellow 142:--;
Line 3, "Thiodiglycol" should red --Thiodiglycol:--;
Line 5, "Co., Ltd.)" should read --Co., Ltd.):--;
Line 6, "Water balance" should read --Water: balance--;
Line 7, "M1" should read --M1:--;
Line 11, "C1" should read --C1:--;
Line 14, "Bk1" should read --Bk1:--.

COLUMN 19,
Line 63, "consists" should read --consist--.

COLUMN 20,
Line 10, "system," should read --system--.

COLUMN 22,
Line 23, "subject" should read --subject to--; and
Line 41, "to" should be deleted.

COLUMN 23,
Line 39, "impact" should read --impacted--;
Line 46, "(4) 4000 $\leq Re \cdot We < 55000$ and $0 < ts \leq 3 \mu m$" should read --$40000 \leq Re \cdot We < 55000$ and $0 < ts \leq 3 \mu m$--; and
Line 57, "election" should read --ejection--.

UNITED STATES PATENT AND TRADEMARK OFFICE

CERTIFICATE OF CORRECTION

PATENT NO. : 5,805,190

DATED : September 8, 1998

INVENTORS : TSUCHII, ET AL.

It is certified that error appears in the above-identified patent and that said Letters Patent is hereby corrected as shown below:

COLUMN 24,
Line 50, "$Re=d \cdot v/v$" should read --$Re=d \cdot v/\nu$--; and
Line 51, "$WE=\rho \cdot d \cdot v^2/\sigma$" should read --$We=\rho \cdot d \cdot v^2/\sigma$--.

COLUMN 25,
Line 36, "election" should read --ejection--.

COLUMN 26,
Line 56, "election" should read --ejection--.

Signed and Sealed this

Thirty-first Day of August, 1999

*Attest:*

Q. TODD DICKINSON

*Attesting Officer*

*Acting Commissioner of Patents and Trademarks*